US008898908B2

(12) United States Patent
Tiirola

(10) Patent No.: US 8,898,908 B2

(45) Date of Patent: Dec. 2, 2014

(54) METHOD FOR MANUFACTURING A FACADE PANEL

(75) Inventor: Samuli Tiirola, Espoo (FI)

(73) Assignee: Stonel Oy, Kangasniemi (FI)

( * ) Notice: Subject to any disclaimer, the term of this patent is extended or adjusted under 35 U.S.C. 154(b) by 383 days.

(21) Appl. No.: 12/737,216

(22) PCT Filed: Jun. 17, 2009

(86) PCT No.: PCT/FI2009/000060

§ 371 (c)(1),
(2), (4) Date: Dec. 17, 2010

(87) PCT Pub. No.: WO2010/004079

PCT Pub. Date: Jan. 14, 2010

(65) Prior Publication Data

US 2011/0094087 A1 Apr. 28, 2011

(30) Foreign Application Priority Data

Jun. 17, 2008 (FI) .................................... 20080405

(51) Int. Cl.

*B23P 17/00* (2006.01)
*E04F 13/14* (2006.01)
*B28B 19/00* (2006.01)
*E04F 21/165* (2006.01)
*E04F 13/08* (2006.01)

(52) U.S. Cl.

CPC ........... *B28B 19/0053* (2013.01); *E04F 13/147* (2013.01); *E04F 21/165* (2013.01); *E04F 13/0862* (2013.01)
USPC ....... 29/897.34; 29/897.32; 29/530; 264/256; 52/745.19

(58) Field of Classification Search

CPC .............. E04B 1/34; E04B 2001/0069; E04B 2001/0053
USPC .............. 29/525.01; 249/83–84; 52/315, 319, 52/348, 349, 350, 356, 414, 600, 601, 52/602; 245/63, 451
See application file for complete search history.

(56) References Cited

U.S. PATENT DOCUMENTS

| | | | | | |
|---|---|---|---|---|---|
| 2,465,871 | A | * | 3/1949 | Hardie et al. | 52/378 |
| 2,825,221 | A | * | 3/1958 | Brouk | 52/293.1 |
| 3,131,514 | A | * | 5/1964 | Siek | 52/315 |
| 3,359,354 | A | * | 12/1967 | Johnson | 264/511 |
| 3,594,968 | A | * | 7/1971 | Johnson | 52/390 |

(Continued)

FOREIGN PATENT DOCUMENTS

| | | | | | |
|---|---|---|---|---|---|
| WO | WO 9606246 | A1 | * | 2/1996 | E04F 13/08 |

*Primary Examiner* — Minh Trinh
(74) *Attorney, Agent, or Firm* — Rodgers & Rodgers

(57) ABSTRACT

A method of manufacturing a facade panel for the outer lining of a building in which tiling forming the outer surface of the panel is formed on the surface of the back panel meant to be the background of the facade panel. Tiling is attached to the back panel and the seams between the tiles are seamed with the help of a seam mass. A bottom panel on top of which a tile controller is set to adjust the locations of the tiles positioned upside down. The back panel is pressed on top of the tiles whereupon attachment spikes attached to the back panel penetrate the seams between the tiles. The tile seams are filled with a jagged rough mass and then filled with a hardening seam mass and attachment spikes attached to the back panel penetrate into the seam mass.

4 Claims, 2 Drawing Sheets

(56) References Cited

U.S. PATENT DOCUMENTS 3,602,476 A * 8/1971 Iragorri .......................... 249/96
3,629,384 A * 12/1971 Elgenstierna ................. 264/130
3,868,801 A * 3/1975 Weiner ......................... 52/309.5
3,892,380 A * 7/1975 Anderson ....................... 249/83
4,031,682 A * 6/1977 Renkert .......................... 52/434
4,644,719 A * 2/1987 Salazar .......................... 52/384
4,930,278 A * 6/1990 Staresina et al. ................ 52/315

* cited by examiner

METHOD FOR MANUFACTURING A FACADE PANEL

BACKGROUND OF THE INVENTION

This invention relates to a manufacturing method of a facade panel meant for the outer lining of a building in which tiling that forms the outer surface of the panel is formed on the surface of the back panel meant to be the background of the facade panel. The tiling is attached to the back panel and the seams between the tiles are seamed with the help of a seam mass whereupon a mold equipped with a bottom panel on top of which a tile controller is set, such as a net in order to adjust the locations of tiles that are positioned upside down. Finally, the back panel is pressed on top of the tiles whereupon attachment spikes extending from the back panel penetrate into the seams between the tiles so the tiling and the back panel are bound together.

A method is known from patent publication FI-117485 in which a special foam gauze is installed on top of the bottom panel of the mold and the mold controller. Foam gauze prevents the extruding of the seam mass towards the seam controller and the bottom panel to prevent them from becoming dirty. In addition, the foam gauze prevents the seam mass from gripping the tile controller and the bottom panel. The disadvantage of this method is the need to use foam gauze and also the fact that the seam mass can be seen outwards from the tile seams. Unfortunately this seam mass often exposes white as brick and mortar seams usually do when the dampness varies. Thus in some cases the seam still needs to be separately covered with some other mass or a covering.

The use of foam gauze is known from patent publications U.S. Pat. No. 2,266,510 and U.S. Pat. No. 3,642,395, from patent publication CH-498696 and from published patent application FI932637. The penetration of the attachment spikes of the back panel into the seam mass is known from patent publication U.S. Pat. No. 4,930,278 and from publication WO 9606246. The use of foam gauze as an aid for the tiling is, however, a difficult additional operation as well as requiring separate extra seam work.

A pre-manufacturing method of a panel formed of ceramic tiles/bricks is known from patent publication U.S. Pat. No. 3,892,380 in which the panel is manufactured on top of a horizontal mold by setting the bricks at their locations with the help of controllers. In the method the seams are first filled from the bottom with a stiff mortar so that this mortar will not leak out underneath and on top of it. This mortar is set in a more liquid form with the end part of the seam space filled and the mortar is added so that there will be the desired layer of the mass on top of the background surfaces of the tiles.

No attachment device is formed for the background surface of this kind of panel during its manufacturing stage in order to attach it onto a wall. The panel cannot endure processing even when the mortar has dried and thus is has to be lifted up and supported by a mold and must be processed vertically. This kind of element gets support from the base and it cannot be installed on a wall.

BRIEF SUMMARY OF THE INVENTION

In order to eliminate the above mentioned defects and disadvantages, a new manufacturing method has been developed of which it is characteristic that tile seams are first filled with a jagged rough mass located against the bottom panel of the mold and after that with a hardening seam mass that binds the tiles to which the seam mass and the attachment spikes of the back panel become penetrated when the back panel is installed.

In the method according to the invention there is no need for foam gauze because a jagged rough mass, such as glass or stone chips having a granular size of 0.5-4 mm and also as coloured versions, is used as the first seaming agent. By this means, the seam can be modified to be better looking. A layer of 3-5 mm rough mass is set on the bottom of the seam whereupon it will be a layer that is visible outwards. When an ordinary seam mass is set to the seam after the rough mass, the seam mass penetrates to the needed amount of rough mass binding it, but it does not penetrate through the rough mass. According to the quality, color and the consistency of the rough mass, the appearance of the seams can be enlivened.

When a separate, metallic main panel is set behind the panel, it can endure processing and it can be hung on the wall supported from the wall. The panel is very thin whereupon it does not increase the thickness of the wall very much.

BRIEF DESCRIPTION OF THE SEVERAL VIEWS OF THE DRAWINGS

In the following the invention is described more detailed by referring to the accompanying drawing in which.

DETAILED DESCRIPTION OF THE INVENTION

Figure 1:
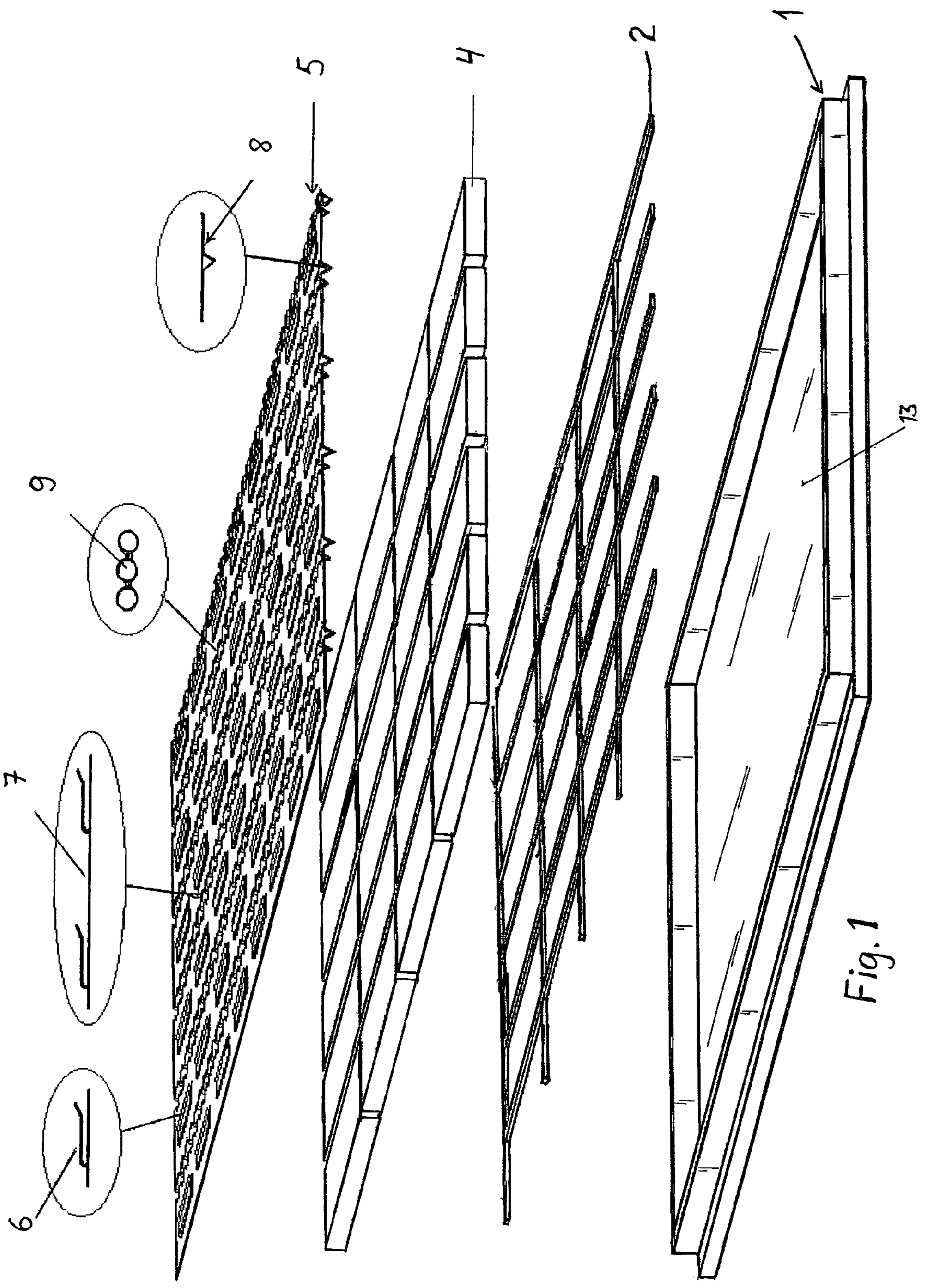
FIG. 1 shows the manufacturing process diagrammatically when the parts are separate from each other.

There is an assembly mold 1 in FIG. 1 to which edges and a bottom panel 13 belong. A tile controller 2 that corresponds to the desired tiling is set on the bottom panel 13 which tile controller is net-like in such a way that its longitudinal and horizontal bars or tiles are a little bit smaller at their diameters or width than the distance of the tiles. Thus the tiles can quickly be set to their right locations and stay there forming tiling 4. After the positioning of the tiles, the controller can be removed.

By using tile controller 2 as an aid, the tiling 4 is set on top of it upside down. This is easy to do with the help of tiles that are essentially thinner than a normal brick when tile controller 2 functions as the controller for the positioning of the tiles. The tile controller 2 can be seen only in the seam spaces. When the tiles have been set, tile controller 2 is removed by lifting it up through the seam spaces in which case there will be more room and gripping surface for the seam mass at the edges of the tiles. After tiling 4, a mechanical seaming is performed most advantageously only to the seam spaces between the tiles in a controlled manner. First the mass to be installed is a jagged rough mass that does not have such flowing binding agent with it that might lead to the dirtying of bottom panel 13 or that the rough mass becomes adhered to it. The next stage is the stage whereupon the seam mass to be added is elastic and flowing in which case it fills the gaps of the tiles without mechanical penetration. The amount of the mass is also easy to restrict to be at the level of the upper surface of the tiles. This mass actually binds the tiles to each other.

After the seam mass has been set, a back panel 5 can immediately be pressed on top of the tiling 4 that is upside down. The back panel 5 has most advantageously been made of a corrosion protected thin plate to which projections 6 and 8 and holes 9 are unlatched either by partial or hole perforations. The back panel 5 has many rows of attachment projections 6. The panel 5 has further level parts 7 from which a grip can be achieved with the help of a suction cup in order to lift and move the panel. Further, panel 5 has attachment projections 8 that are located to match the seam spaces between the tiles and to grip the seam mass. Also, back panel 5 can include additional holes 9 at least at the seam rows so that in order to dry the seam mass the dampness can be let through the holes away from the seam. For example, a small vibration can be immediately used when the back panel is being installed whereupon possible air bubbles can be let out of the seam. The mass, which dries to the service durability most advantageously during one day or faster, can be used as a seam mass. The chosen mass will be such a mass the attachment durability of which is more than 500 N/seam meter.

Figure 2:
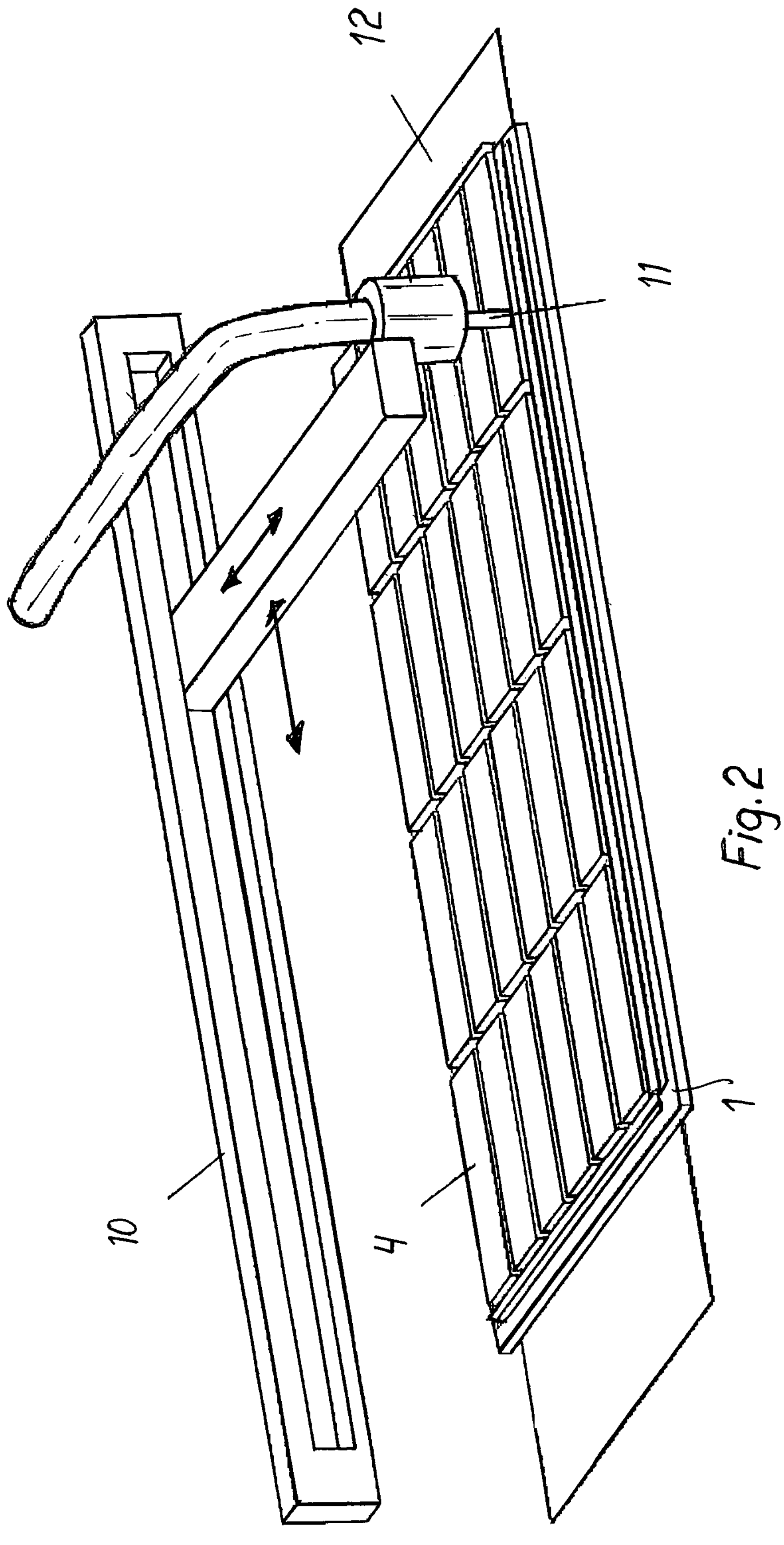
FIG. 2 shows the mechanical seaming between the tiles.

In FIG. 2, there is one example of the mechanical setting of the rough mass and the seam mass to spaces between the tiles. There is portal carrier 10 in the device with which nozzle 11 is moved in the seam spaces. The tiling 4 and the mold 1 move forward with the help of a conveyor 12 to the next station where back panel 5 is installed. When both seamings are performed from the back side of the tiles and the rough mass prevents the seam mass from gripping the bottom panel, proper seaming is achieved.

With the manufacturing method according to this invention, the facade panel is easily manufactured with a very little handwork and only one whole back panel is enough to support the tiling that can be manufactured from an automatic compressor line as a ready-made panel. The ready-made panel manufactured with the method is very thin, only about 3-5 mm thicker than the tile thickness and thus very suitable for the lining.

The invention claimed is:

1. A manufacturing method of making a building facade panel, said facade panel having a back panel and tiling comprising multiple tiles with seams formed between the tiles, the method comprising the steps of:

placing a tile controller on a mold having a bottom panel, positioning the tiles upside down on the tile controller, removing the tile controller, filling the seams partially with a jagged rough mass against the bottom panel of the mold, filling the remainder of the seams with a hardening seam mass that binds the tiles to each other, pressing the back panel having attachment spikes extending therefrom on top of the tiles, and penetrating the attachment spikes of the back panel into the seam mass to bind the back panel and the tiling, whereby the rough mass functions as a layer against the bottom panel of the mold to prevent the seam mass from gripping the bottom panel.

2. The method according to claim 1, further comprising the step of placing the rough mass in the seam with a thickness of 3-5 mm.

3. The method according to claim 1, further comprising the step of setting the seam mass only from the level of the bottom panel to the level of the background surface of the tiles.

4. The method according to claim 1, further comprising the step of using glass and/or stone chips as the rough mass.

* * * * *